March 19, 1929.  F. B. BAIN  1,706,342
GUIDE MAP
Filed Aug. 9, 1926
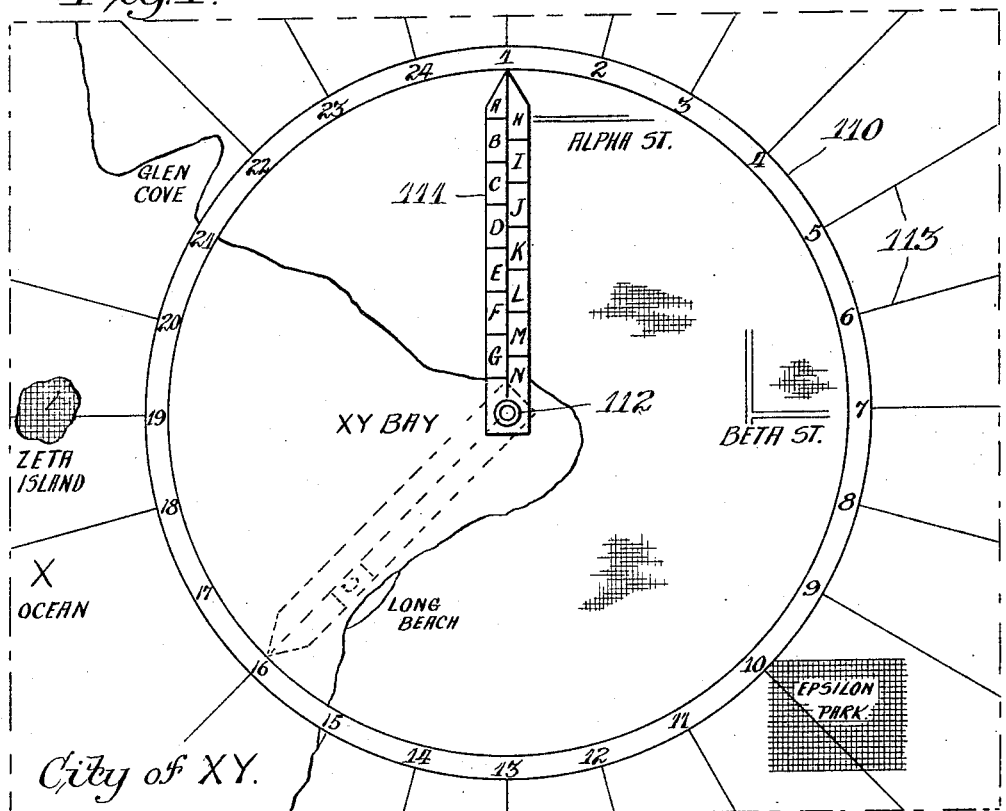

Patented Mar. 19, 1929.

1,706,342

UNITED STATES PATENT OFFICE.

FREDERICK B. BAIN, OF PIEDMONT, CALIFORNIA, ASSIGNOR TO FRED B. BAIN, INC., OF SAN FRANCISCO, CALIFORNIA, A CORPORATION OF CALIFORNIA.

GUIDE MAP.

Application filed August 9, 1926. Serial No. 128,001.

This invention relates to an improved guide map, and has for its object the provision of an improved means for locating principal places on such a map.

A map formed in accordance with the present invention consists of the usual heavy paper chart, on the face of which is printed the outline of a city or other district. At the outer portion of the map is provided a circle having arranged therearound a series of numbers, while in the center of said circle is pivoted to the face of the chart a pointer having indicated letters thereon. At the back of the chart is a set of tables listing in alphabetical or other convenient order the principal places of interest on the map, together with a numeral and letter indicating the direction in which the pointer is to be placed, and opposite which letter on the pointer the place of interest will be found.

The invention will be more fully understood from a consideration of the following detailed description taken with the accompanying drawing, wherein Figure 1 is a plan view of a map embodying the main features of the present invention; and Figure 2 indicates the manner in which tables will be arranged for use therewith, the tables being preferably on the back of said map.

The map shown in Figure 1 represents schematically an imaginary city adjacent a large body of water. Around the outside of the map is a circularly-arranged group of numerals indicated by the reference character 110, while at the center of said map is a pointer 111, having one end thereof pivoted by means of an eyelet rivet 112, the eyelet rivet extending through the material of the chart and through the pointer. Leading out from each one of the circularly arranged numerals are extension lines 113, the function of which will be explained more in detail hereinafter.

Figure 2 must now be referred to in order to make clear the manner in which the chart is used. For instance, the first name appearing on the table is Alpha St., and at the right-hand side of Alpha St. appears the legend 1—H. This means that the pointer 111 is to be directed toward the numeral 1 at the top of the map and Alpha St. searched for opposite the letter H on the pointer. Then again, supposing Long Beach, also listed in the table, is to be located. The pointer 111 is then directed toward the reference character 16, when it will have the position indicated by the dotted lines. Then opposite the letter C, Long Beach will be found.

Supposing the location of Zeta Island is wanted. The table shows that Zeta Island is at 19—EX. The pointer 111 would then be directed toward the numeral 19 and following the extension line we find the location of Zeta Island. Similarly, Glen Cove and Epsilon Park would also be found by referring to the extension lines opposite the numerals 22 and 10 respectively.

In mounting the pointer 111 it is preferable that the pivot be arranged, if possible, in a little used portion of the map. For example, in Figure 1 the pivot is located out in XY Bay in a place where there are no islands or other points which it might be necessary to refer to. It is true that such an ideal place for locating the pivot cannot be found on the maps of all actual cities, but it will be found that there is always some part of a city which will be referred to less often than other parts.

Where the map is to be employed to acquaint strangers with the city, it is very desirable that places of interest, such as hotels, churches, theatres, parks, or the like, can readily be found. These places may be listed under their respective headings on the back of the chart as shown in Figure 2, and where the size of the city permits, the locations of these places may be actually indicated on the map. Otherwise their locations may be indicated opposite their names, and the pointer then utilized to find the location. For example, if a hotel was listed as at the corner of Alpha and Beta Streets, these two streets could be located by means of the pointer and their approximate or actual point of intersection found.

Although I have referred to a specific embodiment of the invention wherein said invention is applied to the map of a city, it is obvious that it may be applied in a great many other forms. A map of a large country such as the United States for instance, could be constructed in this manner and the various cities, etc., located by means of the invention. The idea could be adapted very readily to a map of a large portion of the globe, for instance the islands of the West Indies or Oceania. The location of small islands and the like would in this manner be very easy, and there would at no time be any difficulty in placing the pivot at a point on the map which would not have to be referred to.

For the reasons stated, the invention is not to be limited to the specific embodiment shown and described, but only as defined by the appended claims.

I claim:

1. In a device of the character described, a non-circular chart having a full circle inscribed thereon and having indicating characters around the periphery thereof, and an indicator of a length equal to the radius of said circle pivoted at the center thereof and extending radially, there being indicating indicia on said indicator, and there also being spaced radial lines on said chart extending from and beyond said circle to enable location of places without the confines of said circle.

2. In a device of the character described, a non-circular chart having a full circle inscribed thereon and having indicating characters around the periphery thereof, an indicator of a length equal to the radius of said circle pivoted at the center thereof and extending radially, there being indicating indicia on said indicator, and there also being spaced radial lines on said chart extending from and beyond said circle to enable location of places without the confines of said circle, and lines on said indicator normal to the axis thereof for aligning the indicia upon said indicator with the places appearing on said chart.

FREDERICK B. BAIN.